Jan. 25, 1927.  1,615,569
R. J. R. CHRISTENSEN
PASTRY CUTTER
Filed March 4, 1926
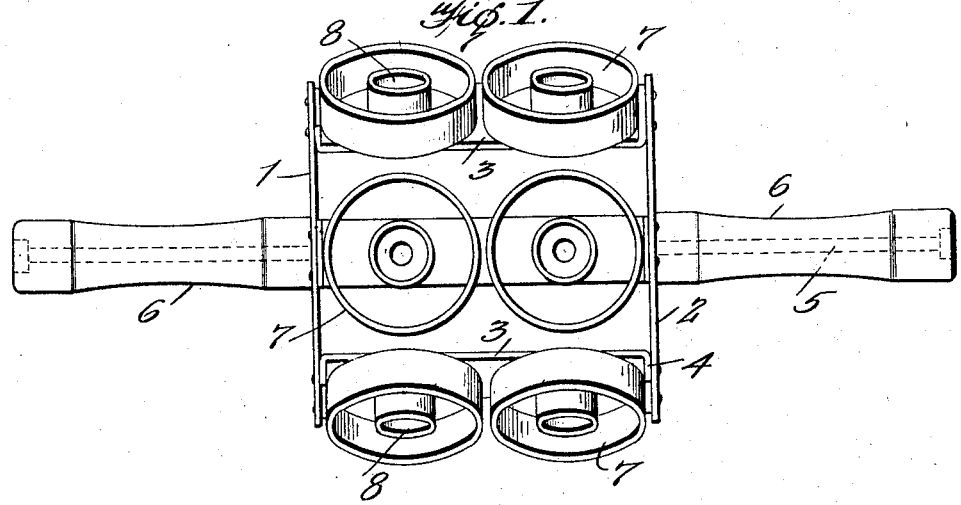
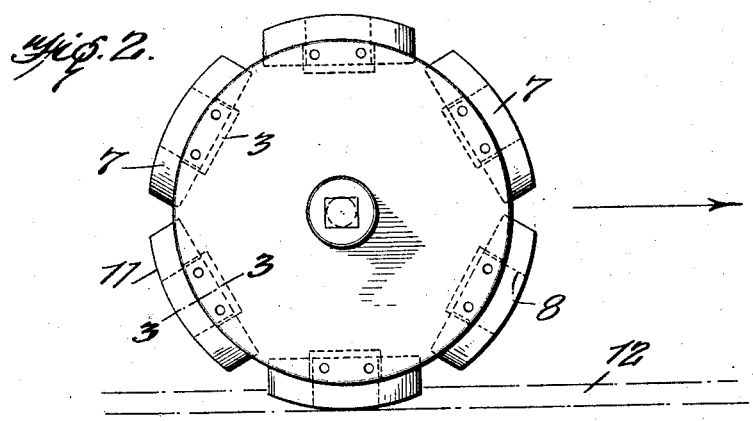
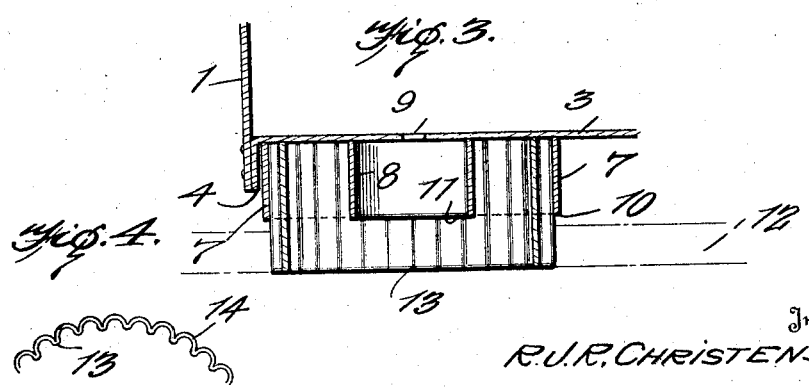
Inventor
R.J.R. CHRISTENSEN,
By
Attorney Patented Jan. 25, 1927.

1,615,569

UNITED STATES PATENT OFFICE.

ROBERT J. R. CHRISTENSEN, OF BREMERTON, WASHINGTON.

PASTRY CUTTER.

Application filed March 4, 1926. Serial No. 92,314.

This invention relates to improvements in devices for cutting pastry dough to provide a series of desired forms in such dough to be afterwards cooked.

The invention is directed particularly to a cutting device of this type embodying a series of cutters which are so relatively arranged that the device as a whole may be rolled over the layer of dough and cut therefrom a series of forms in a single operation.

The invention is further constructed with a view to permitting a variation in the cutting devices in a simple expeditious manner.

The invention is illustrated in the accompanying drawings, in which:

Fig. 1 is a view in front elevation of the improved cutter.

Fig. 2 is a side elevation of the same.

Fig. 3 is a section of one of the cutters and part of the frame, an auxiliary cutter being shown therein.

Fig. 4 is a broken edge view of an auxiliary cutter.

The improved cutter comprises two disc-like heads 1 and 2, held in spaced relation by supporting strips 3, having out-turned ends 4 through which the strips are secured to the heads in parallel relation to the axis of the cutter and adjacent the periphery of the heads. A bar or shaft 5 extends axially of the heads and is provided beyond each head with a comparatively free handle 6, whereby the implement as a whole may be rolled without turning the handles.

Secured upon the supports 3 are the main cutters, here shown as comprising circular wall members 7 of desired diameter within which are arranged similar cutters 8 of smaller diameter, the supports 3 within the base of the smaller cutters 8 being formed with an air hole 9. The free or cutting edges 10 and 11 of the cutters 7 and 8 project beyond the peripheral edges of the heads 2 and have an arcuate formation corresponding to the peripheral formation of such heads.

Obviously in the use of the cutter described, it may be rolled over the layer of dough indicated at 12 in Fig. 2 and cut therefrom a series of forms which correspond to the usual doughnut form, the edges being regular and sharply defined owing to the comparatively thin cutting edges of the cutters 7 and 8.

By reason of the curved form of the cutting edges circumferentially of the cutter, the device as a whole may be rolled smoothly over the layer of dough and produce more regular and evenly cut articles than if the edges were square, for in the latter instance, there is a perceptible step or jar in moving from one cutter to the next, with a tendency to displace the device as a whole and produce an irregular edged article.

While the edges of the fixed cutter are plain, it is contemplated that any irregular or fluted contour be given to the edges of the articles to be cut, if desired, for which purpose an auxiliary cutter or cutters 13, comprising angular or ring-like members fluted axially as at 14, may be provided. The exterior diameter of the auxiliary cutters is such that they may be fitted within and frictionally held by the main cutters 7, as illustrated in Fig. 3. The axial length of the auxiliary cutters is greater than that of the main cutters, so that in the use of the device, where the auxiliary cutters are applied, the latter only will cut through the dough.

What is claimed as new, is:—

A pastry cutter, comprising spaced heads, handles projecting laterally from the center of each head, supports extending axially between the heads and terminally connected to the respective heads, and cutters mounted on the supports and comprising inner and outer concentric bands with the diameter of the inner band corresponding to the width of the support and the diameter of the outer band being materially greater than the width of the support, whereby beyond the support the outer bands are open at the bottom and the space between adjacent cutters on spaced supports is wholly free of obstruction.

In testimony whereof I affix my signature.

ROBERT J. R. CHRISTENSEN.